May 28, 1963
N. FUR
3,091,191
CARRIER DRIVING DEVICE FOR CONVEYOR SYSTEMS
Filed Sept. 20, 1961
2 Sheets-Sheet 1
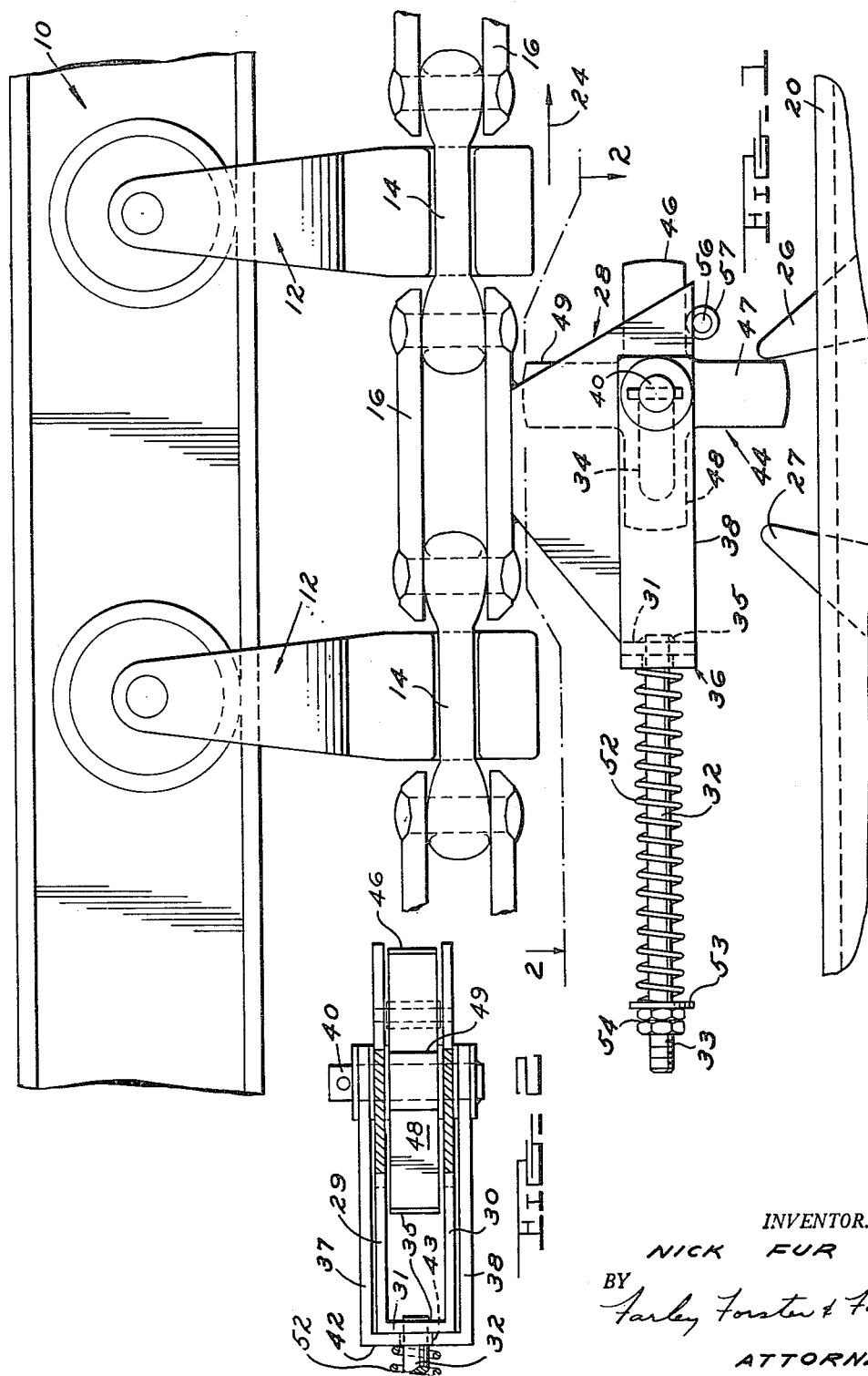
INVENTOR.
NICK FUR
BY
Farley Forster & Farley
ATTORNEYS

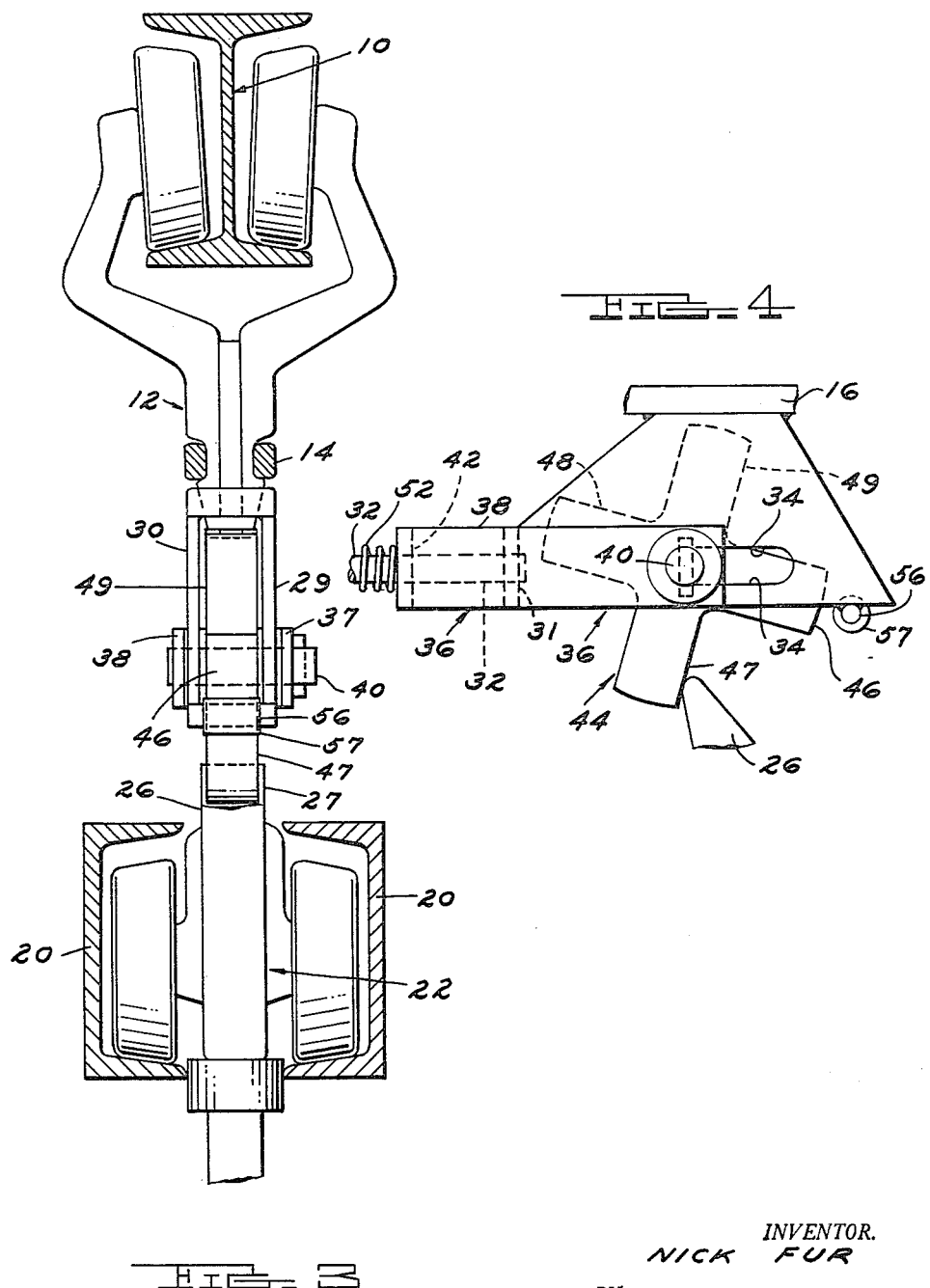

United States Patent Office 3,091,191
Patented May 28, 1963

3,091,191
CARRIER DRIVING DEVICE FOR CONVEYOR
SYSTEMS
Nick Fur, Burlington, Ontario, Canada, assignor to Jervis B. Webb Company, Detroit, Mich., a corporation of Michigan
Filed Sept. 20, 1961, Ser. No. 139,407
7 Claims. (Cl. 104—172)

This invention relates to an improved construction for a device for transmitting a force between the driving and driven members, or drive elements associated respectively with the propelling means and a carrier of a conveyor system, which is self-releasing from driving relation in the event the driving force exceeds a desired amount. The device of the invention is employed as one member of this pair of drive elements to perform one or more of the following functions:

(a) To limit the load on a propelling device;

(b) To permit carriers to be stopped and accumulated in a bank without stopping the propelling device;

(c) To absorb the shock when a moving driving member comes into engagement with a stationary driven member.

A device constructed in accordance with the invention essentially consists of drive transmitting member which is mounted by suitable means for reciprocating movement in a direction having at least a substantial component in the direction of a driving force between propelling means and a carrier, and which is also mounted for rotation on an axis transverse to such direction of movement. The drive transmitting member is provided with a plurality of arms each of which extends radially from the axis of rotation, and stop means are included, preferably engageable by one of these arms, for arresting rotation of the member about its axis in positions in which one of the arms is adapted to form one of a pair of drive elements. Reciprocating movement of the drive transmitting member takes place in one direction in proportion to the magnitude of a driving force and is opposed by suitable spring means acting to return the member to a normal, drive transmitting position. When the driving force is of sufficient magnitude, the drive transmitting member is moved to a position where it becomes disengaged from the stop means, permitting the member to rotate, and thereby moving the arm which was acting as one driving element out of driving engagement with the other driving element.

Other features and advantages will be brought out in connection with the following description of the representative embodiment disclosed in the accompanying drawings wherein the device is shown forming the driving member of a pair of drive elements. These drawings consist of the following views:

FIGURE 1, a side elevation showing the device of the invention mounted on a conveyor chain and in engagement with one of the driven members of a carrier (not shown);

FIGURE 2, a fragmentary sectional plan view taken as indicated by the line 2—2 of FIG. 1;

FIGURE 3, a transverse elevation of the structure shown in FIG. 1 including the carrier trolley; and FIGURE 4, a fragmentary side elevation of drive transmitting member shown in FIG. 1 and illustrating disengaging movement thereof.

Components of a conventional "power and free" conveyor system are illustrated in FIGS. 1 and 3 and include, as elements of the power portion of the system, a track 10 supporting trolleys 12 which are secured to the center links 14 of a conventional conveyor chain consisting of these center links 14 alternated with pairs of side bars 16; and, as components of the "free" portion of the system, a vertically aligned trackway of channel members 20 which support carrier trolleys 22.

A pair of drive elements are employed to transmit a driving force from the power to the free portion of the system, one of these elements being a driving member carried by either the chain or trolleys, and the other a driven member on a carrier trolley 22, it being understood that the device of the invention can be employed as either member of the pair of drive elements. In the construction shown, however, the device is employed as a driving member to transmit a driving force from the propelling trolleys and chain, in the direction of the arrow 24 (FIG. 1), to the carrier trolley 22 which is equipped with a conventional driven member or dog 26 and a holdback dog 27.

The device includes a supporting bracket 28, which as shown in FIG. 2 is U-shaped in plan, having a pair of side portions 29 and 30 connected by an end portion 31. A rod 32 having a threaded end 33, is securely fixed at 35 to the end portion 31, and transversely aligned slots 34 are formed in each of the supporting bracket side portions 29 and 30. A U-shaped slide or carrier 36 has side portions 37 and 38 (FIG. 2) which straddle the sides of the supporting bracket and carry a cross pin 40 engaging the slots 34 in the side portions thereof, and the end section 42 of the slide 36 is provided with an aperture 43 for loosely engaging the rod 32.

A drive transmitting member 44 is mounted on the pin 40 for rotation on the axis defined thereby, this axis being transverse to the direction of movement indicated by the arrow 24 and the member 44 is equipped with a plurality of radially extending arms 46, 47, 48 and 49.

Thus the drive transmitting member is rotatably mounted on the slide 36 which in turn is mounted for reciprocating movement in the direction defined by the slots 34 and rod 32, this direction being parallel to the direction of driving force 24 or at least including a substantial component which is parallel to the direction of driving force. A spring 52 is mounted on the rod 32 between the end section 42 of the slide 36 and a washer 53 which is positioned longitudinally on the rod by a pair of adjusting nuts 54. This spring exerts a force on the slide 36 in the direction of the arrow 24 and moves the slide to a normal position defined by the end section 42 of the slide abutting the end portion 31 of the supporting bracket 28.

In this normal position, rotating movement of the drive transmitting member 44 is restrained by a stop which consists of a rod 56 secured between the sides 29 and 30 of the supporting bracket and carrying a roller 57, the stop acting against one of the arms, the arm 46 as shown in FIG. 1, to position the drive transmitting member so that another one of its arms 47 is placed to the driven member 26 of the carrier trolley 22 and acts as a drive element.

Increasing driving reaction against the arm 47 is accompanied by increasing movement of the drive transmitting member 44 and slide 36 on the bracket 28 in the direction of the reaction, this movement being opposed by the spring 52, the arm 46 riding along the stop roller 57. If this relative movement between the slide 36 and bracket 28, or between the drive transmitting member 44 and stop 57 exceeds that desired for maximum driving force, as determined by the characteristics of the spring 52 and the setting thereof established by the nuts 54, the arm 46 moves free of the restraining stop as shown in FIG. 4, and the pusher arm 47, which had been acting as the driving element, rotates out of driving relation with the trolley dog 26. The reaction on the drive transmitting member 44 of course is then reduced, allowing the slide 36 to be moved back towards the normal position by the spring 52 so that the next following arm 49 will engage the stop roller 57 to place the preceding arm 46 in a driving position.

Reciprocating movement of the drive transmitting member between the normal position and a position short of disengagement from the stop is available for absorbing the impact when the driving arm overtakes and engages a carrier.

It will readily be appreciated that the amount of driving force transmitted from the propelling means to a carrier and hence the maximum load on the propelling means, can be regulated according to the characteristics of the spring 52 selected, and can be varied within limits for a particular spring by changing the setting of the nuts 54.

Any suitable device (not shown) may be employed for stopping a carrier at a selected work station along the conveyor. Any following trolleys which overtake a stopped trolley will also stop and be automatically disengaged from the driving device which served to propel them. Once the stop is removed, each leading trolley will in turn be picked up and again propelled by the next driving device which overtakes it.

While preferred embodiments have been described above in detail, it will be understood that numerous modifications might be resorted to without departing from the scope of the invention as defined in the following claims.

I claim:

1. A device for use as one of a pair of drive elements for transmitting a driving force between the propelling means and a carrier of a conveyor system comprising a drive transmitting member, means mounting said member for movement on an axis transverse to the direction of travel of said propelling means, said member having a plurality of arms spaced around said axis and extending outwardly therefrom, stop means for arresting movement of said member in positions in which one of said arms is placed to act as one of said drive elements, means supporting said drive transmitting member for motion relative to said stop means in response to increasing driving reaction on said one arm acting as a drive element between a normal position of engagement with said stop means and a second position in which said drive transmitting member is disengaged from said stop means for movement on said axis whereby said one arm acting as a drive element is moved out of engagement with the other of said pair of drive elements, and resilient means urging said drive transmitting member to the said normal position.

2. A device according to claim 1 wherein said stop means comprises a stop member engageable by an arm of said drive transmitting member except when said drive transmitting member has been moved to the said second position thereof.

3. A device for use as one of a pair of drive elements for transmitting a driving force between the propelling means and a carrier of a conveyor system comprising supporting structure, a slide member, means mounting said slide member on said supporting structure for reciprocating movement between first and second positions in a direction having a substantial component in the direction of said driving force, resilient means normally urging said slide member to the said first position thereof, a drive transmitting member, means connecting said drive transmitting member to said slide member for movement on an axis transverse to the direction of travel of said propelling means, one of said drive elements carried by said drive transmitting member, and stop means carried by said supporting structure for engagement by said drive transmitting member when said slide member is in the first position thereof to position said one drive element for engagement with the other drive element and for permitting movement of said drive transmitting member on said axis when said slide member is in the second position thereof to disengage said one drive element from said other drive element.

4. A device according to claim 1 wherein said means mounting said slide member on said supporting structure comprises a guide rod carried by said supporting structure and slidably engaged by a portion of said slide member, a pin carried by said slide member for defining the said axis of movement of said drive transmitting member, said pin being slidably carried by said supporting structure.

5. A device according to claim 4 wherein said resilient means comprises a spring mounted on said guide rod and engaging said slide member.

6. A device for use as one of a pair of drive elements for transmitting a driving force between the propelling means and a carrier of a conveyor system comprising a supporting bracket adapted to be secured to said propelling means, a drive transmitting member, a drive transmitting member carrier, means securing said drive transmitting member to said carrier for rotation on an axis transverse to the path of movement of said propelling means, means mounting said carrier on said supporting bracket for reciprocating movement between a normal position and a second position in a path generally parallel to the path of travel of said propelling means, said drive transmitting member having a plurality of arms extending generally radially from said axis, resilient means urging said carrier to said normal position, and a stop secured to said supporting bracket, said stop being engaged by one of said arms when said slide is in its normal position to place another of said arms in driving position to act as a drive element, said one arm moving out of engagement with said stop when said slide is in its said second position to permit said drive transmitting member to rotate about said axis and withdraw said other arm from said driving position.

7. A device according to claim 6 in which said stop includes a roller member mounted on an axis parallel to the axis of rotation of said drive transmitting member.

References Cited in the file of this patent

UNITED STATES PATENTS

| | | |
|---|---|---|
| 797,610 | Schaefer | Aug. 22, 1905 |
| 2,161,388 | Rosenthal | June 6, 1939 |
| 2,956,514 | Bishop | Oct. 18, 1960 |